(12) United States Patent
Hsu et al.

(10) Patent No.: US 12,498,534 B2
(45) Date of Patent: Dec. 16, 2025

(54) OPTICAL SYSTEM

(71) Applicant: TDK TAIWAN CORP., Taoyuan (TW)

(72) Inventors: Chan-Jung Hsu, Taoyuan (TW);
Chen-Hsin Huang, Taoyuan (TW);
Chen-Hung Chao, Taoyuan (TW);
Yi-Ho Chen, Taoyuan (TW); Kun-Shih Lin, Taoyuan (TW); Shou-Jen Liu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 683 days.

(21) Appl. No.: 17/881,950

(22) Filed: Aug. 5, 2022

(65) Prior Publication Data

US 2023/0266561 A1 Aug. 24, 2023

Related U.S. Application Data

(60) Provisional application No. 63/312,987, filed on Feb. 23, 2022.

(30) Foreign Application Priority Data

Jul. 8, 2022 (CN) .......................... 202210806294.1

(51) Int. Cl.
*G02B 7/08* (2021.01)
*G02B 27/64* (2006.01)

(52) U.S. Cl.
CPC ............. *G02B 7/08* (2013.01); *G02B 27/646* (2013.01)

(58) Field of Classification Search
CPC ...... G02B 27/646; G02B 6/3514; G02B 7/08; G02B 7/09; G02B 7/182; G02B 15/173; G02B 15/14; G02B 15/177; G02B 15/22; G02B 15/16; G02B 13/18; G02B 13/009; G02B 27/64; G02B 13/02; G02B 7/04; G02B 13/0015; G02B 15/15; G02B 13/0045; G02B 15/17; G02B 15/20; G02B 27/0025; G02B 9/62; G02B 13/04; G02B 7/023; G02B 9/64; G02B 13/001; G02B 13/0065; G02B 15/10; G02B 15/163; G02B 15/167; G02B 23/02; G02B 7/02; G02B 7/022; G02B 7/102; G02B 7/14; G02B 9/04; G02B 9/34; G02B 9/60;

(Continued)

(56) References Cited

U.S. PATENT DOCUMENTS

2020/0225442 A1* 7/2020 Weng ...................... H04N 23/54
2023/0266637 A1* 8/2023 Hsu ..................... H02K 41/0356
396/489

* cited by examiner

*Primary Examiner* — Stephone B Allen
*Assistant Examiner* — Tamara Y. Washington
(74) *Attorney, Agent, or Firm* — MUNCY, GEISSLER, OLDS & LOWE, P.C.

(57) ABSTRACT

An optical system is provided and includes a first optical element driving mechanism, which includes a first fixed assembly, a first movable assembly, and a first driving assembly. The first movable assembly is configured to be connected to a first optical element, and the first movable assembly is movable relative to the first fixed assembly. The first movable assembly includes a first movable element. The first drive assembly is configured to drive the first movable assembly to move relative to the first fixed assembly. The first fixed assembly and the first movable assembly are arranged along a main axis, and the first driving assembly is configured to drive the first movable element to move around the main axis.

20 Claims, 14 Drawing Sheets

(58) Field of Classification Search
CPC .... G02B 13/002; G02B 13/004; G02B 13/06; G02B 13/16; G02B 15/12; G02B 15/161; G02B 17/08; G02B 17/0804; G02B 17/0808; G02B 17/0896; G02B 21/26; G02B 23/08; G02B 26/004; G02B 26/0808; G02B 26/0816; G02B 27/0911; G02B 27/644; G02B 3/14; G02B 7/021; G02B 7/025; G02B 7/18; G02B 7/24; G02B 7/28; G02B 9/00; G02B 9/24; H04N 5/23287; H04N 5/2252; H04N 5/2254; H04N 5/2329; H04N 5/2257; H04N 5/2253; H04N 5/23248; H04N 5/2328; H04N 5/225; H04N 5/232; H04N 5/23209; H04N 5/23212; H04N 5/23245; H04N 5/23258; H04N 5/23264; H04N 13/0203; H04N 13/0239; H04N 13/0296; H04N 5/222; H04N 5/228; H04N 5/23229; H04N 5/23251; H04N 5/23254; H04N 5/23261; H04N 5/23274; H04N 5/238; H04N 23/58; H04N 23/687; H04N 23/55; G03B 5/00; G03B 3/00; G03B 3/14; G03B 5/02; G03B 5/06; G03B 2205/0015; G03B 3/10; G03B 2205/0069; G03B 2205/002; G03B 2205/0007; G03B 13/36; G03B 17/02; G03B 17/04; G03B 17/14; G03B 17/12; G03B 2205/0046; G03B 2205/0053; G03B 2205/0092

See application file for complete search history.

OPTICAL SYSTEM

CROSS REFERENCE TO RELATED APPLICATIONS

This application claims the benefit of U.S. Provisional Application No. 63/312,987, filed on Feb. 23, 2022, and China Patent Application No. 202210806294.1, filed Jul. 8, 2022, the entirety of which are incorporated by reference herein.

BACKGROUND OF THE DISCLOSURE

Field of the Disclosure

The present disclosure relates to an optical system, and in particular it relates to an optical system having an aperture structure.

Description of the Related Art

As technology has developed, many of today's electronic devices (such as smartphones) have a camera and video functionality. Using the camera modules disposed in electronic devices, users can use their electronic devices to capture photographs and record videos.

Today's design for electronic devices continues to follow the trend of miniaturization, meaning that the various components of the camera module and its structure must also be continuously reduced, so as to achieve miniaturization. In general, a driving mechanism in the camera module has a camera lens holder configured to hold a camera lens, and the driving mechanism can have the functions of auto focusing or optical image stabilization. In addition, the camera module can also be equipped with an aperture mechanism to adjust the amount of light. However, although the existing driving mechanism can achieve the aforementioned functions of photographing and video recording, they still cannot meet all of the users' needs.

Therefore, how to design a camera module that can perform auto-focus, optical anti-shake, adjust the amount of light and achieve miniaturization at the same time are topics nowadays that need to be discussed and solved.

BRIEF SUMMARY OF THE DISCLOSURE

Accordingly, one objective of the present disclosure is to provide an optical system to solve the above problems.

According to some embodiments of the disclosure, an optical system is provided and includes a first optical element driving mechanism, which includes a first fixed assembly, a first movable assembly, and a first driving assembly. The first movable assembly is configured to be connected to a first optical element, and the first movable assembly is movable relative to the first fixed assembly. The first movable assembly includes a first movable element. The first drive assembly is configured to drive the first movable assembly to move relative to the first fixed assembly. The first fixed assembly and the first movable assembly are arranged along a main axis, and the first driving assembly is configured to drive the first movable element to move around the main axis.

According to some embodiments, the optical system further includes a second optical element driving mechanism. The first optical element driving mechanism is disposed on the second optical element driving mechanism. The first fixed assembly includes: an outer shielding member; a first frame; and a first base. The first frame is affixed to the first base. The outer shielding member is affixed to the first frame. The first frame is located between the outer shielding member and the first base. The first movable element is disposed in the first frame. The first movable element is rotatable around the main axis relative to the first frame.

According to some embodiments, the first optical element driving mechanism further includes a first rolling assembly disposed between the first movable element and the first base. The first rolling assembly includes at least three first rolling elements. The first movable element rotates around the main axis relative to the first base and the first frame by the first rolling elements. The first optical element is movably connected to the first movable element. When the first movable element rotates around the main axis, the first optical element moves relative to the first fixed assembly and the first movable assembly, so as to adjust the amount of external light entering the first optical element driving mechanism.

According to some embodiments, the first optical element driving mechanism further includes an inner shielding member. The inner shielding member is disposed between the outer shielding member and the first movable element. When viewed along the main axis, the outer shielding member has a ring structure and a first outer opening. When viewed along the main axis, the inner shielding member has a ring structure and a first inner opening. The maximum size of the first outer opening is different from the maximum size of the first inner opening. The maximum size of the first outer opening is greater than the maximum size of the first inner opening.

According to some embodiments, a first guiding groove is formed on the outer shielding member. The first optical element has a first upper protruding pillar and a first lower protruding pillar. When viewed along the main axis, the first upper protruding pillar does not overlap the first lower protruding pillar. The first lower protruding pillar is configured to insert the first movable element. The first guiding groove is configured to accommodate the first upper protruding pillar.

According to some embodiments, when the first movable element rotates around the main axis, the first optical element rotates around the first lower protruding pillar, and the first upper protruding pillar is configured to move along the first guiding groove, so that the first optical element selectively blocks the first inner opening. When viewed along the main axis, the extending direction of the first guiding groove is deviated from the center of the outer shielding member.

According to some embodiments, the second optical element driving mechanism includes: a second fixed assembly; a second movable assembly, configured to be connected to a second optical element; and a second driving assembly, configured to drive the second movable assembly and the second optical element to move relative to the second fixed assembly. The second fixed assembly includes a casing and a second base. The casing is affixed to the second base to form an accommodation space. The accommodation space is configured to accommodate the second movable assembly and the second driving assembly. The casing surrounds a portion of the first optical element driving mechanism. The second movable assembly has a receiving trench extending along a first axis. The first movable assembly includes a second movable element disposed in the receiving trench. The second movable element is configured to move along the first axis in the receiving trench.

According to some embodiments, the first optical element driving mechanism further includes a driving member affixed to the second movable element. The driving member has a cylindrical structure and extends along a second axis. The second axis is perpendicular to the first axis. The second axis is parallel to the main axis. A circular slot is formed on the second movable element, and the driving member is inserted into the circular slot. A plurality of glue grooves is formed on the second movable element and is communicated with the circular slot. The glue grooves are configured to accommodate glue so that the driving member is affixed in the circular slot.

According to some embodiments, the first movable element has a first body and a clamping portion. When viewed along the main axis, the clamping portion has a U-shaped structure. The clamping portion radially extends from the first body. The clamping portion is configured to clamp the driving member. When the second movable element moves along the first axis, the driving member is configured to be in contact with the clamping portion to drive the first movable element to rotate around the main axis, thereby driving the first optical element to selectively block the first inner opening.

According to some embodiments, the first body has plastic material. The clamping portion has a plastic material and a metal material, and the plastic material covers the metal material. The first frame has an arc opening. The clamping portion is exposed from the arc opening. An angle of the arc opening is greater than a limit movement angle of the first movable element.

According to some embodiments, the second movable element has a second body. The second body has a long strip-shaped structure extending along the first axis. When viewed along the main axis, the length of the receiving trench in the first axis is greater than the length of the second body in the first axis. The receiving trench has a middle receiving portion and two side receiving portions. The two side receiving portions extend from the middle receiving portion along the first axis. The middle receiving portion is configured to accommodate the second body.

According to some embodiments, the first optical element driving mechanism further includes a blocking member having a long strip-shaped structure extending along the first axis. The blocking member is fixedly disposed in the two side receiving portions. The second movable element further includes two receiving structures disposed on opposite sides of the second body. The blocking member is suspended in the two receiving structures. The blocking member is not in contact with the receiving structures. The blocking member is not in contact with the second body.

According to some embodiments, the second movable assembly further includes at least three receiving grooves, extending along the first axis. The first optical element driving mechanism further includes a second rolling assembly disposed between the second movable element and the second movable assembly. The second rolling assembly includes at least three second rolling elements, which are respectively disposed in the at least three receiving grooves. The second movable element moves along the first axis relative to the second movable assembly by the second rolling elements. When viewed along the main axis, the second rolling elements form a triangle. The triangle is an isosceles triangle.

According to some embodiments, the receiving grooves are concaved from a receiving surface in the receiving trench. The receiving grooves are communicated with the receiving trench. When viewed along the first axis, at least one of the receiving grooves includes a v-shaped structure and two straight line structures. The v-shaped structure is connected to the receiving surface via the two straight line structures. The two straight line structures are respectively connected to the receiving surface via two fillets. A radius of curvature of each fillet is less than 0.04 mm. The second rolling element is in contact with the V-shaped structure.

According to some embodiments, the first optical element driving mechanism further includes a first circuit assembly fixedly disposed on the casing. When viewed along a third axis, the first circuit assembly has an L-shaped structure. The third axis is perpendicular to the first axis and the second axis. The first driving assembly includes a first magnetic element fixedly disposed on the second movable element. The first driving assembly further includes a first coil, corresponding to the first magnetic element. The first coil is fixedly disposed on the first circuit assembly. The first optical element driving mechanism further includes a first position sensing element disposed on the first circuit assembly. The first coil surrounds the first position sensing element. The first position sensing element corresponds to the first magnetic element.

According to some embodiments, the second optical element driving mechanism further includes a second circuit assembly electrically connected to the second driving assembly. The first circuit assembly has a first electrical connection portion. The second circuit assembly has a second electrical connection portion. The first electrical connection portion and the second electrical connection portion are located on the same side of the optical system.

According to some embodiments, the second base has a first supporting portion configured to support the first electrical connection portion. The second base further has a second supporting portion configured to support the second electrical connection portion. The second base further has a middle dividing portion connected between the first supporting portion and the second supporting portion. The middle dividing portion is configured to separate the first electrical connection portion and the second electrical connection portion. When viewed along the first axis, the middle dividing portion completely overlaps the first electrical connection portion or the second electrical connection portion.

According to some embodiments, the first electrical connection portion has a first outer surface. The second electrical connection portion has a second outer surface. The first outer surface and the second outer surface are located on the same plane. The second base further includes a bottom plate, and the first supporting portion and the second supporting portion extend from the bottom plate along the second axis. The distance between the first electrical connection portion and the bottom plate in the second axis is equal to the distance between the second electrical connection portion and the bottom plate in the second axis.

According to some embodiments, the optical system includes a first adhesive element, a second adhesive element and a third adhesive element. The first adhesive element is configured to affix the first electrical connection portion to the first supporting portion. The second adhesive element is configured to affix the second electrical connection portion to the second supporting portion. The first adhesive element is not in contact with the second electrical connection portion. The second adhesive element is not in contact with the first electrical connection portion. The third adhesive element is configured to adhere to the first electrical connection portion, the second electrical connection portion and the casing. When viewed along the third axis, the third adhesive element overlaps the first electrical connection portion and the second electrical connection portion.

According to some embodiments, a portion of the first optical element driving mechanism is located outside the casing. The first fixed assembly is located outside the casing. When viewed along the third axis, the first fixed assembly does not overlap the casing. The second movable element is located within the casing. The driving member extends from the inside of the casing to the outside of the casing. When viewed along the second axis, the clamping portion overlaps at least a portion of the casing. When viewed along the second axis, the first fixed assembly does not overlap the casing.

The present disclosure provides an optical system including a first optical element driving mechanism and a second optical element driving mechanism. The first optical element driving mechanism may serve as an aperture mechanism, configured to adjust the amount of light entering the optical system. The second optical element driving mechanism can achieve the functions of auto-focusing (AF) and optical image stabilization (OIS).

In some embodiments, when the second movable element is driven to move along the first axis, the driving member is configured to be in contact with the clamping portion to drive the first movable element to rotate around the main axis, thereby drive the first optical elements to adjust the size of the aperture. It is worth noting that, the second movable element is disposed in the second frame of the second optical element driving mechanism, so the purpose of miniaturization can be achieved. Furthermore, based on the configurations of the second movable element, the driving member and the first movable element, the size of the aperture of the first optical element driving mechanism can be continuously changed.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
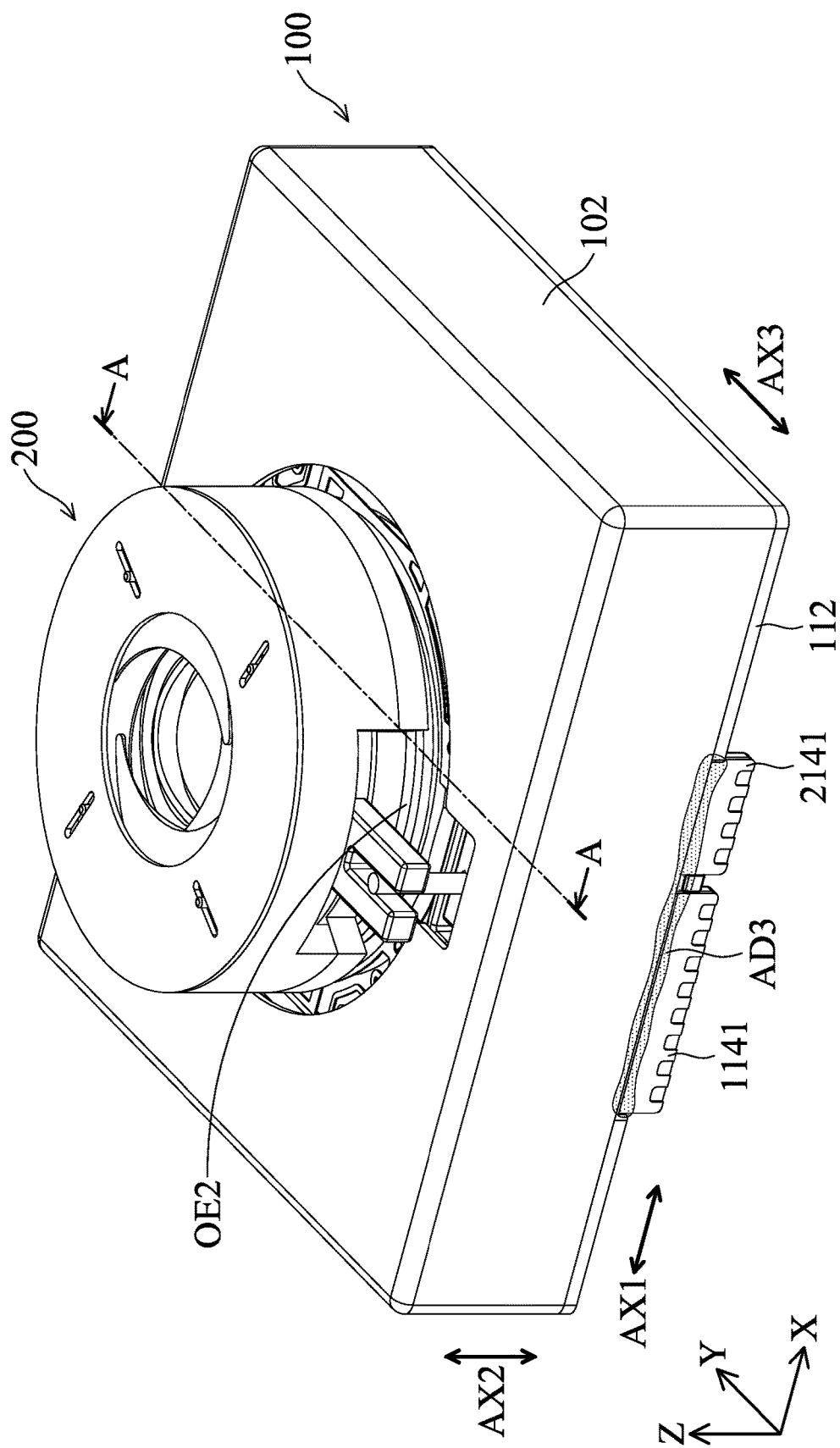
FIG. 1 is a schematic diagram of an optical system 10 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
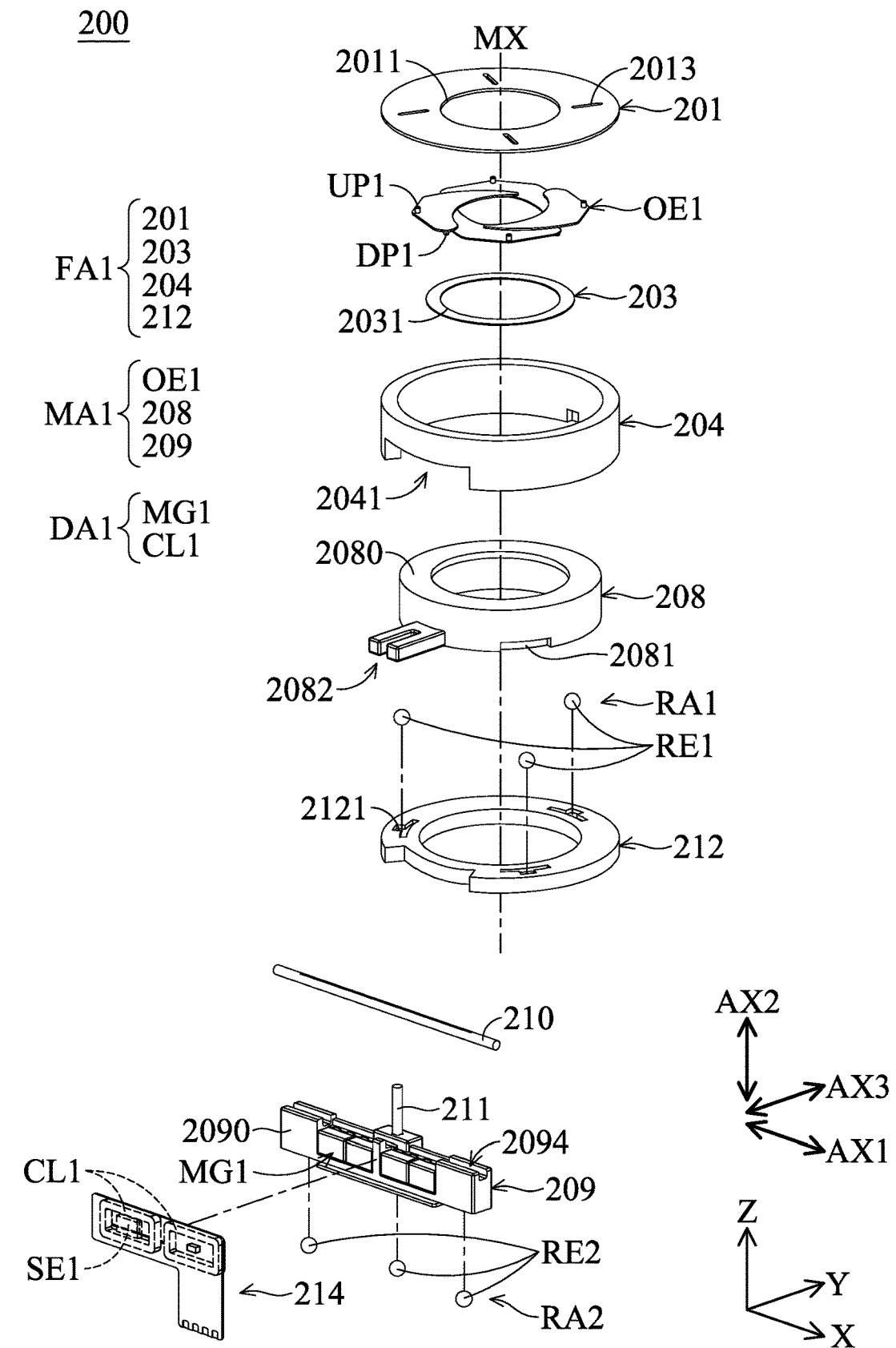
FIG. 2 is an exploded diagram of a first optical element driving mechanism 200 according to an embodiment of the present disclosure.
Figure 3:
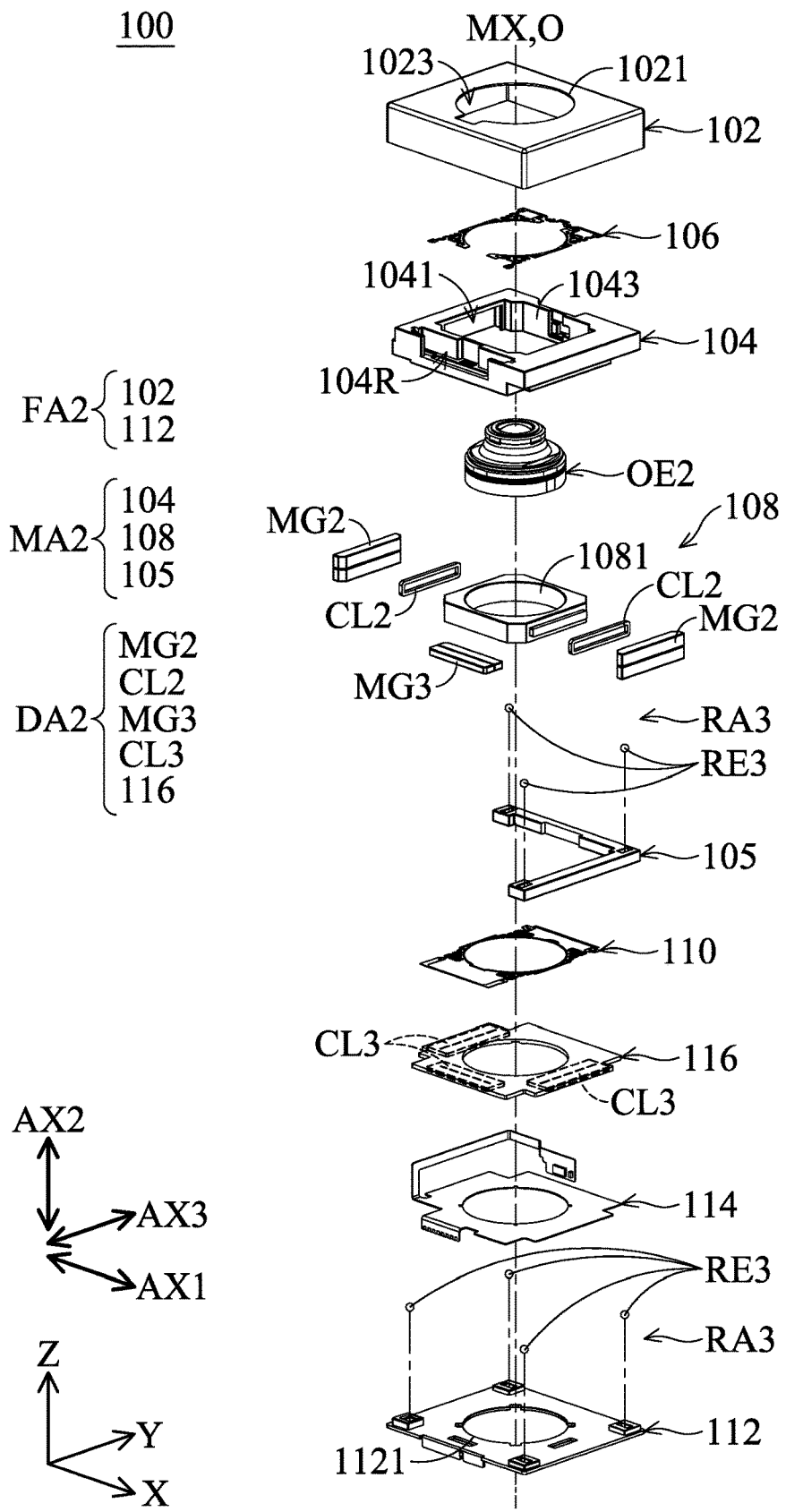
FIG. 3 is an exploded diagram of a second optical element driving mechanism 100 according to an embodiment of the present disclosure.

Please refer to FIG. 1 to FIG. 3. FIG. 1 is a schematic diagram of an optical system 10 according to an embodiment of the present disclosure, FIG. 2 is an exploded diagram of a first optical element driving mechanism 200 according to an embodiment of the present disclosure, and FIG. 3 is an exploded diagram of a second optical element driving mechanism 100 according to an embodiment of the present disclosure. The optical system 10 can be an optical camera system and can be configured to hold and drive an optical element. The optical system 10 can be installed in various electronic devices or portable electronic devices, such as a smartphone, for allowing a user to perform the image capturing function. In this embodiment, the optical system 10 can be a voice coil motor (VCM) with an auto-focusing (AF) function, but it is not limited thereto. In other embodiments, the optical system 10 can also perform the functions of auto-focusing and optical image stabilization (OIS).

In this embodiment, the optical system 10 may include the first optical element driving mechanism 200 and the second optical element driving mechanism 100. The first optical element driving mechanism 200 may serve as an aperture mechanism, configured to adjust the amount of light entering the optical system 10. The second optical element driving mechanism 100 can be the aforementioned voice coil motor, so that the optical system 10 can have auto focus (AF) and optical anti-shake (OIS) functions. In this embodiment, the first optical element driving mechanism 200 is disposed on the second optical element driving mechanism 100.

The first optical element driving mechanism 200 includes a first fixed assembly FA1, a first movable assembly MA1, and a first driving assembly DA1. The first movable assembly MA1 is configured to be connected to at least one first optical element OE1, and the first movable assembly MA1 is movable relative to the first fixed assembly FA1. The first movable assembly MA1 may include a first movable element 208 and a second movable element 209. The first driving assembly DA1 is configured to drive the first movable assembly MAT to move relative to the first fixed assembly FAT.

As shown in FIG. 2, the first fixed assembly FA1 and the first movable assembly MA1 are arranged along a main axis MX, and the first driving assembly DA1 is configured to drive the second movable element 209 to move along a first axis AX1 (the X-axis), thereby driving the first movable element 208 to move around the main axis MX.

The first fixed assembly FA1 may include an outer shielding member 201, an inner shielding member 203, a first frame 204 and a first base 212. The first frame 204 is affixed to the first base 212, the outer shielding member 201 is affixed to the first frame 204, and the first frame 204 is located between the outer shielding member 201 and the first base 212. The inner shielding member 203 is disposed between the outer shielding member 201 and the first movable element 208. For example, the inner shielding member 203 can be disposed on the first movable element 208 or the first frame 204.

When viewed along the main axis MX, the outer shielding member 201 has a ring structure and a first outer opening 2011. When viewed along the main axis MX, the inner shielding member 203 has a ring structure and a first inner opening 2031. The maximum size of the first outer opening 2011 is different from the maximum size of the first inner opening 2031. For example, the maximum size of the first outer opening 2011 is greater than the maximum size of the first inner opening 2031.

Furthermore, the first movable element 208 is disposed in the first frame 204, and the first movable element 208 is rotatable around the main axis MX relative to the first frame 204. Specifically, the first optical element driving mechanism 200 may further include a first rolling assembly RA1 disposed between the first movable element 208 and the first base 212.

In this embodiment, the first rolling assembly RAT includes at least three first rolling elements RET. The first rolling element RE1 is, for example, a sphere, and is disposed in a groove 2121 of the first base 212 and in a groove 2081 of the first movable element 208, so that the first movable element 208 rotates around the main axis MX relative to the first base 212 and the first frame 204 by these first rolling elements RE1.

In this embodiment, the first optical element driving mechanism 200 may include four first optical elements OE1, which are movably connected to the first movable element 208. The number of the first optical element OE1 is not limited to this embodiment. When the first movable element 208 rotates around the main axis MX, the first optical element OE1 can move relative to the first fixed assembly FA1 and the first movable assembly MAT, thereby adjusting the amount of external light entering the first optical element driving mechanism 200 from the exterior.

Specifically, four first guiding grooves 2013 are formed on the outer shielding member 201, and each first optical element OE1 has a first upper protruding pillar UP1 and a first lower protruding pillar DP1. When viewed along the main axis MX, the first upper protruding pillar UP1 does not overlap the first lower protruding pillar DP1.

The first lower protruding pillar DP1 is configured to insert the first movable element 208, and the first guiding groove 2013 is configured to accommodate the corresponding first upper protruding pillar UP1. When the first movable element 208 rotates around the main axis MX, the first optical element OE1 rotates around the first lower protruding pillar DP1, and the first upper protruding pillar UP1 is configured to move along the first guiding groove 2013, so that the first optical element OE1 selectively blocks the first inner opening 2031.

It is worth noting that when viewed along the main axis MX, the extending direction of the first guiding groove 2013 deviates from the center (the main axis MX) of the outer shielding member 201.

Furthermore, the second movable element 209 is disposed in a second frame 104 of a second movable assembly MA2 of the second optical element driving mechanism 100. Specifically, the second frame 104 has a receiving trench 104R extending along the first axis AX1, and the second movable element 209 is disposed in the receiving trench 104R. The second movable element 209 is configured to move along the first axis AX1 within the receiving trench 104R.

As shown in FIG. 2, the first optical element driving mechanism 200 further includes a driving member 211 which is affixed to the second movable element 209. The driving member 211 has a cylindrical structure and extends along a second axis AX2 (the Z-axis). The second axis AX2 is perpendicular to the first axis AX1, and the second axis AX2 is parallel to the main axis MX.

The first movable element 208 has a first body 2080 and a clamping portion 2082. When viewed along the main axis MX, the clamping portion 2082 has a U-shaped structure. The clamping portion 2082 extends radially from the first body 2080, and the clamping portion 2082 is configured to clamp the driving member 211.

When the second movable element 209 moves along the first axis AX1, the driving member 211 is configured to be in contact with the clamping portion 2082 to drive the first movable element 208 to rotate around the main axis MX, thereby driving the first optical elements OE1 to selectively block the first inner opening 2031.

In this embodiment, the first body 2080 has a plastic material, the clamping portion 2082 has a plastic material and a metal material, and the plastic material covers the metal material. Specifically, the metal material can have a U-shaped structure, and is embedded in the plastic material by insert molding technology.

As shown in FIG. 2, the first frame 204 has an arc opening 2041, and the clamping portion 2082 is exposed from the arc opening 2041. It is worth noting that the angle of the arc opening 2041 is greater than the limit movement angle (the maximum angle of movement) of the first movable element 208.

Next, as shown in FIG. 3, the second optical element driving mechanism 100 includes a second fixed assembly FA2, a second movable assembly MA2 and a second driving assembly DA2. The second movable assembly MA2 is configured to be connected to a second optical element OE2. The second driving assembly DA2 is configured to drive the second movable assembly MA2 and the second optical element OE2 to move relative to the second fixed assembly FA2.

The second fixed assembly FA2 includes a casing 102 and a second base 112. The casing 102 is affixed to the second base 112 to form an accommodation space 1023, and the accommodation space 1023 is configured to accommodate the second movable assembly MA2 and the second driving assembly DA2. Additionally, as shown in FIG. 1, the casing 102 may surround a portion of the first optical element driving mechanism 200.

Furthermore, in this embodiment, the second movable assembly MA2 may include a second frame 104, a holder 108 and an intermediate bracket 105. The holder 108 is configured to hold the second optical element OE2.

As shown in FIG. 3, the aforementioned casing 102 has a hollow structure, and a casing opening 1021 is formed thereon, and a base opening 1121 is formed on the second base 112. The center of the casing opening 1021 corresponds to an optical axis O of the second optical element OE2 held by the holder 108, and the base opening 1121 corresponds to an image sensing element (not shown) disposed under the second base 112.

As shown in FIG. 3, the holder 108 has a hollow annular structure, and has a through hole 1081. The through hole 1081 forms a threaded structure (not shown) corresponding to another threaded structure (not shown) on the second optical element OE2, such that the second optical element OE2 can be locked in the through hole 1081. Furthermore, the second driving assembly DA2 may include two second coils CL2 disposed on the holder 108.

In this embodiment, the second driving assembly DA2 may further include two second magnetic elements MG2 and a third magnetic element MG3. The second frame 104 has a plurality of grooves 1041 and a central opening 1043. In this embodiment, the second frame 104 has three grooves 1041 for accommodating the aforementioned second magnetic elements MG2 and third magnetic element MG3, but the number of grooves 1041 and magnetic elements is not limited to this embodiment. The holder 108 and the aforementioned second optical element OE2 are disposed in the central opening 1043 and can move relative to the second frame 104.

Furthermore, the second driving assembly DA2 may further include a circuit board 116. The circuit board 116 has three third coils CL3 disposed therein. The number of the third coils CL3 is not limited to this embodiment. The second optical element driving mechanism 100 further includes a second circuit assembly 114 electrically connected to the second driving assembly DA2. Specifically, the second circuit assembly 114 is electrically connected to the circuit board 116 and an external control circuit, and the external control circuit can control the third coils CL3 to be turned on or off.

In this embodiment, the optical system 10 may further include a first elastic element 106 and a second elastic element 110, and the holder 108 may be connected to the second frame 104 through the first elastic element 106 and the second elastic element 110 to be suspended in the central opening 1043. When the second coils CL2 are energized, the two second magnetic elements MG2 act with the second coils CL2 to generate an electromagnetic driving force, thereby driving the holder 108 to move along the optical axis O (the Z-axis) relative to the second frame 104 to perform the auto focusing function.

As shown in FIG. 3, the second optical element driving mechanism 100 may further include a third rolling assembly RA3. The third rolling assembly RA3 may include seven third rolling elements RE3 (balls). three of the third rolling elements RE3 are disposed between the second frame 104 and the intermediate bracket 105, other three third rolling elements RE3 are disposed between the intermediate bracket 105 and the second base 112, and the last third rolling element RE3 is disposed between the second frame 104 and the second base 112.

Therefore, the second frame 104 can move along a third axis AX3 (the Y-axis) relative to the intermediate bracket 105 by the third rolling assembly RA3, and the intermediate bracket 105 and the second frame 104 can move along the first axis AX1 relative to the second base 112 by the third rolling assembly RA3. The third axis AX3 is perpendicular to the first axis AX1 and the second axis AX2.

When the third coils CL3 are energized and are induced with the corresponding second magnetic elements MG2 and the third magnetic element MG3, an electromagnetic driving force is generated to drive the second frame 104 to drive the holder 108 to move along the Y-axis or along the X-axis. Therefore, when the optical system 10 is shaken, the holder 108 can be driven by the aforementioned electromagnetic driving force to move on the X-Y plane, so as to achieve the purpose of optical image stabilization.

Figure 4:
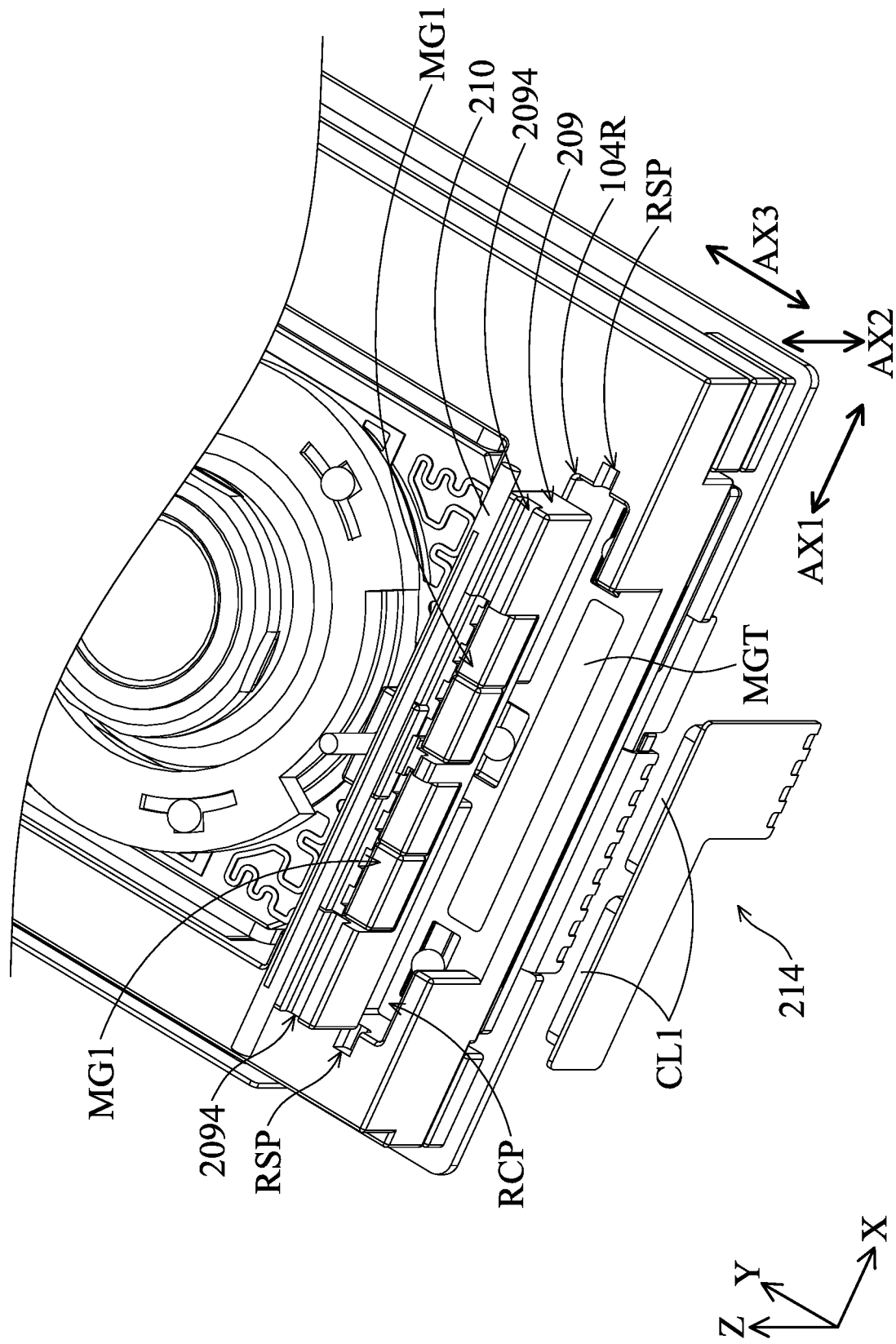
FIG. 4 is a perspective view of a partial structure of the optical system 10 according to an embodiment of the present disclosure.
Figure 5:
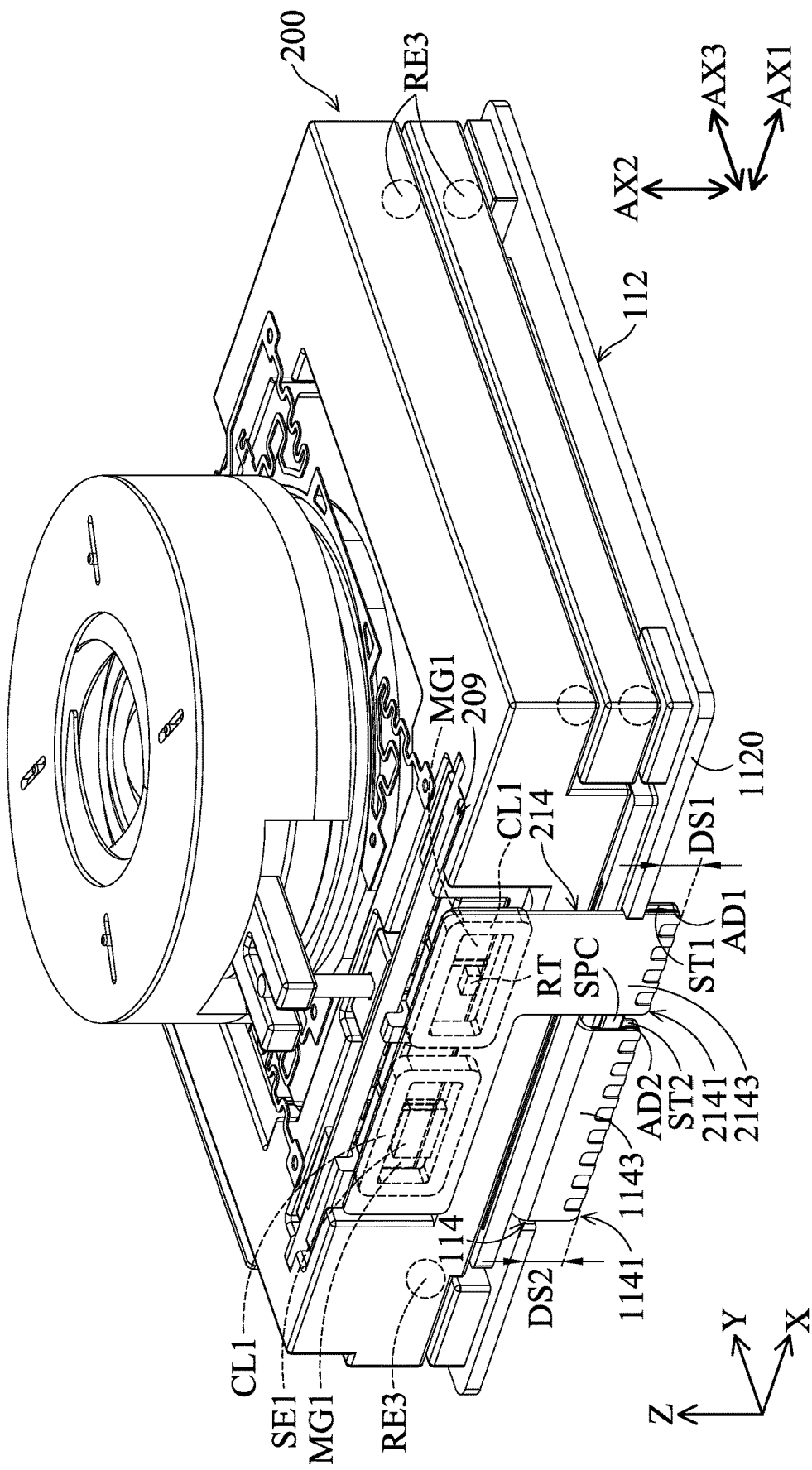
FIG. 5 is a perspective view of the optical system 10 after removing the casing 102 according to an embodiment of the present disclosure.
Figure 6:
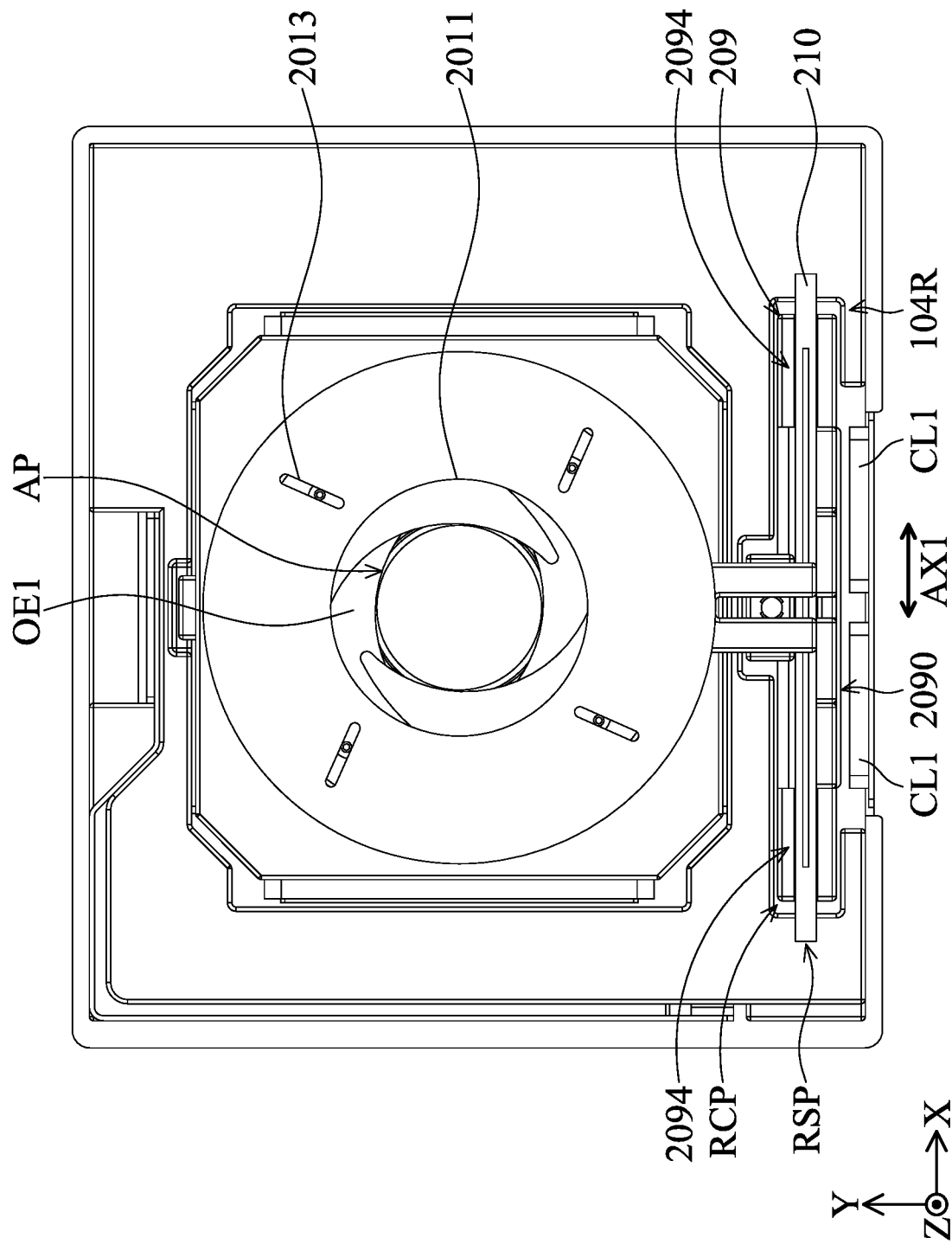
FIG. 6 is a top view of a partial structure of the optical system 10 according to an embodiment of the present disclosure.

Please refer to FIG. 2 to FIG. 6. FIG. 4 is a perspective view of a partial structure of the optical system 10 according to an embodiment of the present disclosure, FIG. 5 is a perspective view of the optical system 10 after removing the casing 102 according to an embodiment of the present disclosure, and FIG. 6 is a top view of a partial structure of the optical system 10 according to an embodiment of the present disclosure.

The first optical element driving mechanism 200 further includes a first circuit assembly 214 (such as a circuit board), which is fixedly disposed on the casing 102. When viewed along the third axis AX3, the first circuit assembly 214 has an L-shaped structure. Furthermore, the first driving assembly DA1 includes two first magnetic elements MG1 fixedly disposed on the second movable element 209, and the two first magnetic elements MG1 are arranged along the first axis AX1. In this embodiment, the first magnetic elements MG1, the second magnetic elements MG2 and the third magnetic element MG3 can be magnets, but they are not limited thereto.

The second optical element driving mechanism 100 further includes a magnetic member MGT disposed in the receiving trench 104R. In the second axis AX2, a portion of the second movable element 209 is located between the two first magnetic elements MG1 and the magnetic member MGT. A magnetic attraction force is generated between the two first magnetic elements MG1 and the magnetic member MGT, so that the second movable element 209 is not separated from the receiving trench 104R.

The first driving assembly DA1 further includes two first coils CL1 corresponding to the two first magnetic elements MG1 respectively. The two first coils CL1 are fixedly disposed on the first circuit assembly 214, and the two first coils CL1 are arranged along the first axis AX1. When the two first coils CL1 are energized, the two first coils CL1 can act with the first magnetic elements MG1 to generate an electromagnetic driving force to drive the second movable element 209 to move along the first axis AX1.

Figure 7:
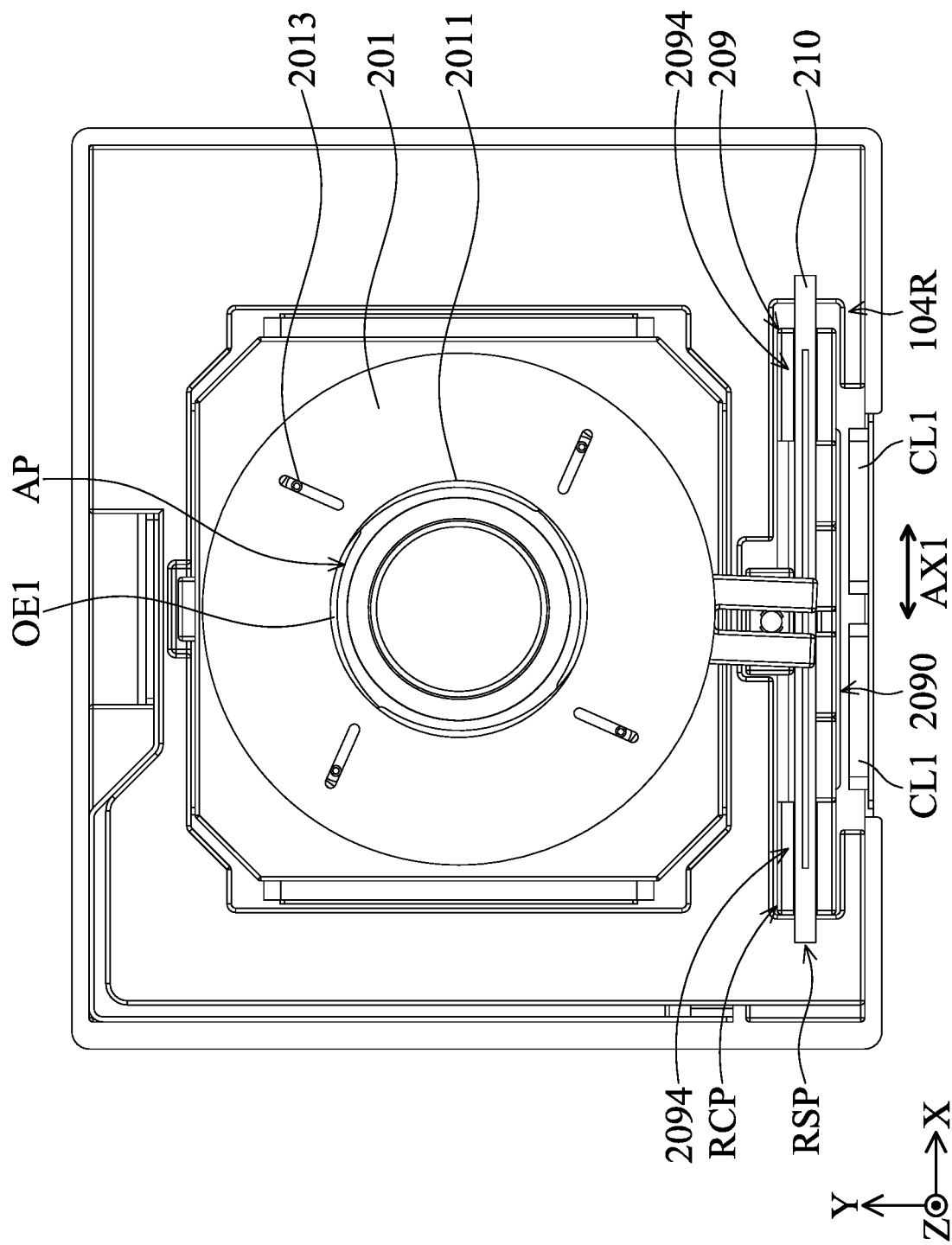
FIG. 7 is a top view of the second movable element 209 in a first extreme position according to an embodiment of the present disclosure.
Figure 8:
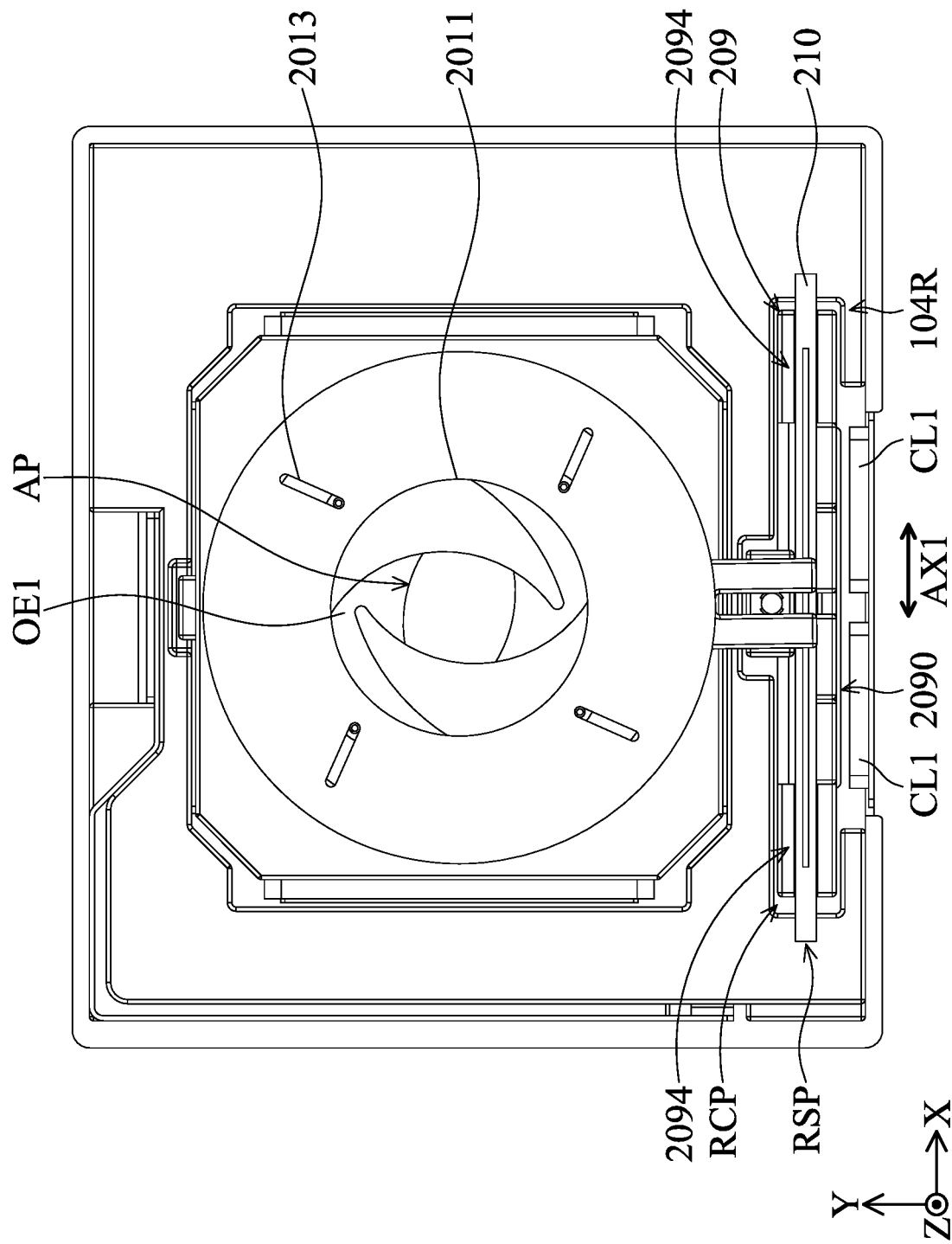
FIG. 8 is a top view of the second movable element 209 in a second extreme position according to an embodiment of the present disclosure.

For example, please refer to FIG. 6 to FIG. 8. FIG. 7 is a top view of the second movable element 209 in a first extreme position according to an embodiment of the present disclosure, and FIG. 8 is a top view of the second movable element 209 in a second extreme position according to an embodiment of the present disclosure. When the two first coils CL1 are energized, the second movable element 209 can be driven to move between the first extreme position and the second extreme position, thereby driving the first optical elements OE1 (the blades) to move, so as to change the amount of light entering the first optical element driving mechanism 200.

For example, as shown in FIG. 7, when the second movable element 209 is in the first extreme position, the first optical elements OE1 are accommodated under the outer shielding member 201, so that the aperture AP of first optical element driving mechanism 200 has the largest size (in some embodiments, the size of the aperture AP may be equal to the size of the first inner opening 2031 at this time). When it is desired to adjust the size of the aperture AP, the second movable element 209 can be driven to move from the first extreme position in FIG. 7 to the position in FIG. 6, so that the four first optical elements OE1 begin to shield the first outer opening 2011, and therefore the aperture AP is gradually narrowed.

Furthermore, as shown in FIG. 8, when the second movable element 209 moves from the position in FIG. 6 to the second extreme position in FIG. 8, the four first optical elements OE1 continue to shield the first outer opening 2011, so that the aperture AP gradually shrinks to a minimum size. Based on the above structural configuration, the size of the aperture AP of the first optical element driving mechanism 200 can be continuously changed, so that the image captured by the optical system 10 can be clearer.

As shown in FIG. 4 and FIG. 6, the second movable element 209 has a second body 2090, and the second body 2090 has a long strip-shaped structure extending along the first axis AX1. When viewed along the main axis MX, the length of the receiving trench 104R in the first axis AX1 is greater than the length of the second body 2090 in the first axis AX1.

The receiving trench 104R has a middle receiving portion RCP and two side receiving portions RSP. The two side receiving portions RSP extend from the middle receiving portion RCP along the first axis AX1. The middle receiving portion RCP is configured to accommodate the second body 2090. Furthermore, the first optical element driving mechanism 200 may further include a blocking member 210 having a long strip-shaped structure extending along the first axis AX1. For example, the blocking member 210 is a cylinder, but it is not limited thereto.

The blocking member 210 is fixedly disposed in the two side receiving portions RSP. For example, the blocking member 210 can be fixed in the two side receiving portions RSP by glue. Furthermore, as shown in FIG. 4, the second movable element 209 further includes two receiving structures 2094 disposed on opposite sides of the second body 2090.

It should be noted that the blocking member 210 is suspended in the two receiving structures 2094. That is, the blocking member 210 is not in contact with the receiving structures 2094, and the blocking member 210 is not in contact with the second body 2090. When the optical system 10 is impacted, the blocking member 210 may be in contact with the second movable element 209 to prevent the second movable element 209 from detaching from the receiving trench 104R.

Figure 9:
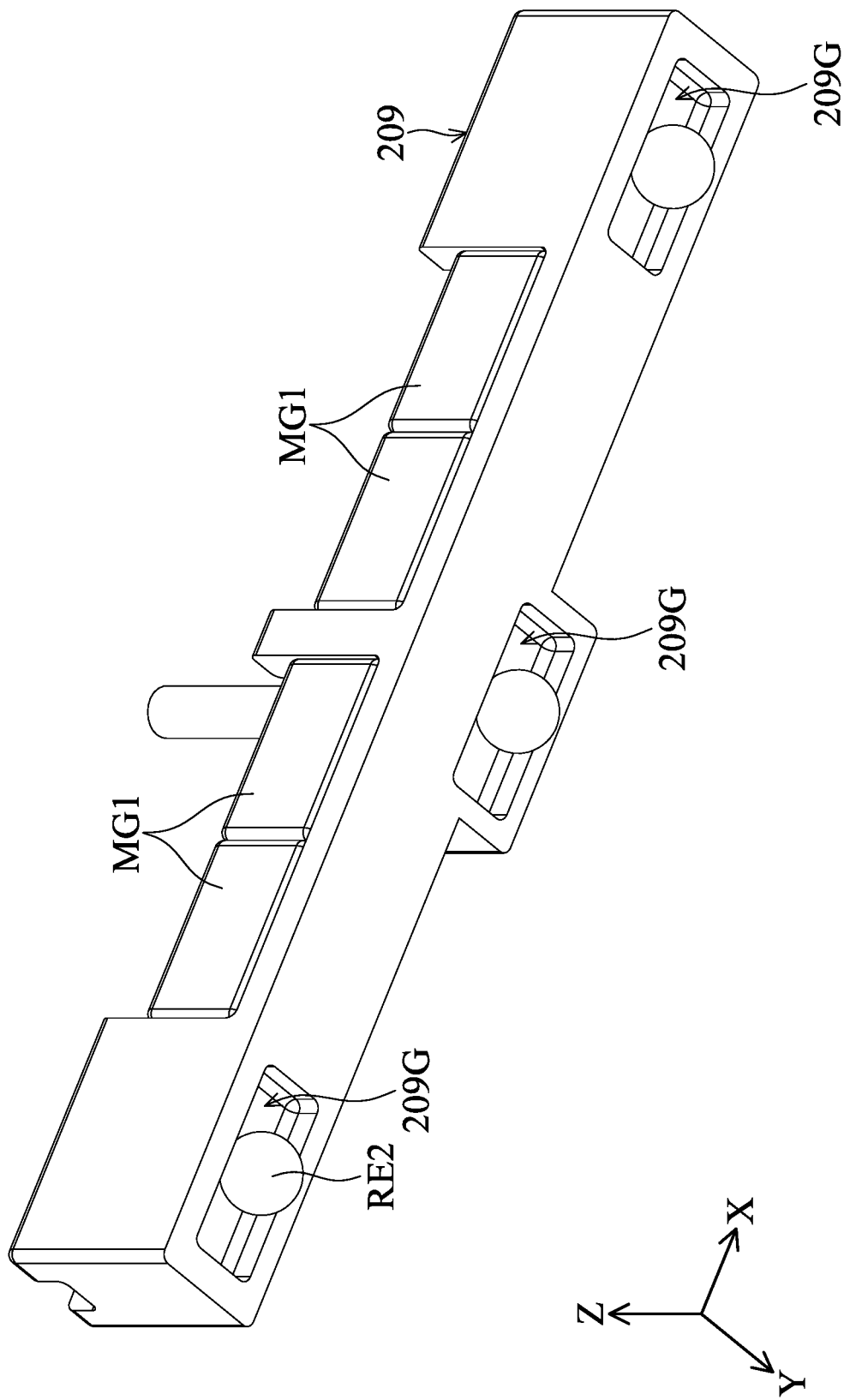
FIG. 9 is a perspective view of the second movable element 209 and the first magnetic elements MG1 according to an embodiment of the present disclosure.
Figure 10:
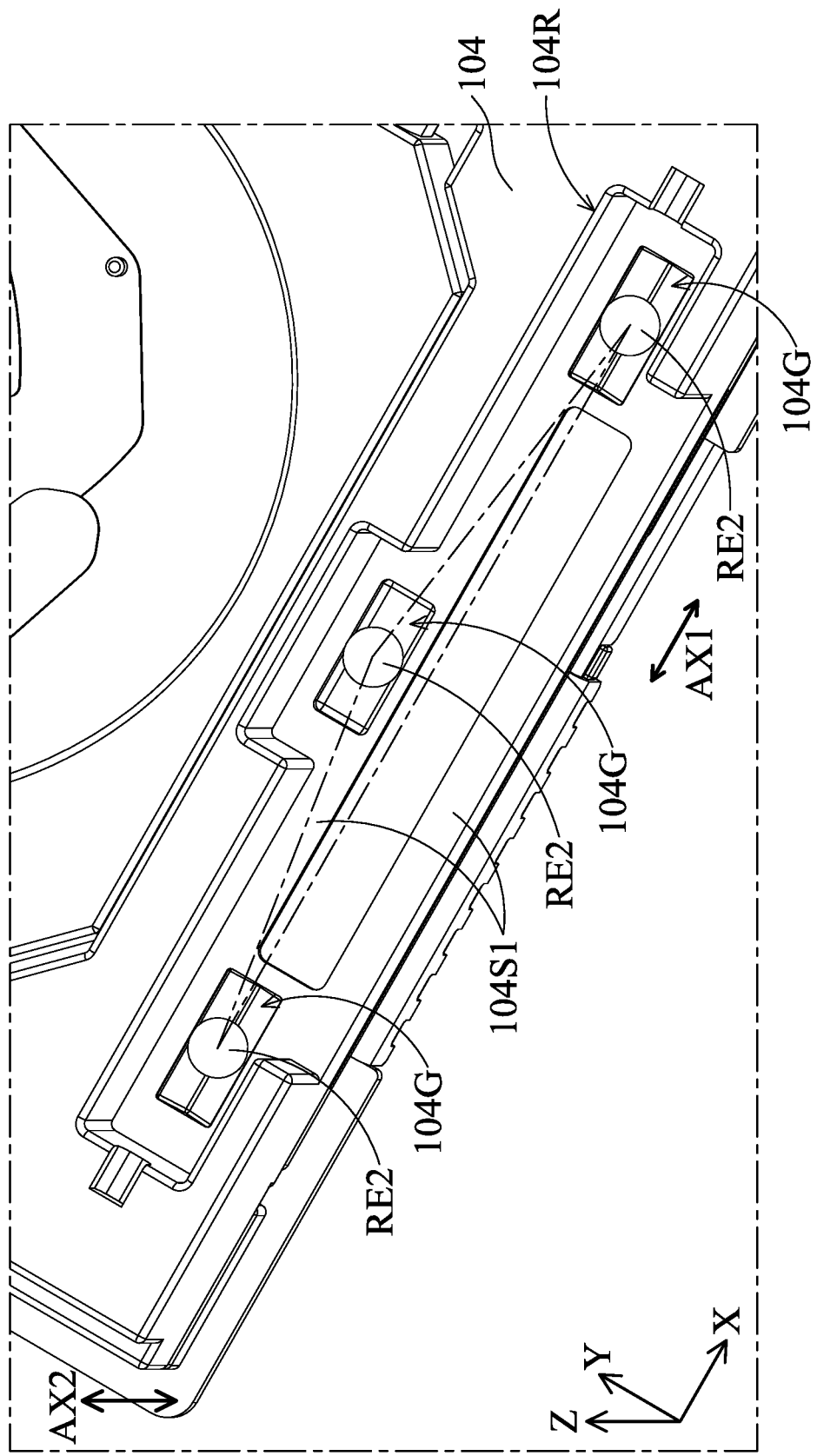
FIG. 10 is an enlarged diagram of the second frame 104 according to an embodiment of the present disclosure.

Please refer to FIG. 9 and FIG. 10. FIG. 9 is a perspective view of the second movable element 209 and the first magnetic elements MG1 according to an embodiment of the present disclosure, and FIG. 10 is an enlarged diagram of the second frame 104 according to an embodiment of the present disclosure. In this embodiment, the second frame 104 of the second movable assembly MA2 further includes at least three receiving grooves 104G extending along the first axis AX1, and the second movable element 209 correspondingly includes at least three receiving grooves 209G.

The first optical element driving mechanism 200 further includes a second rolling assembly RA2 disposed between the second movable element 209 and the second frame 104 of the second movable assembly MA2. Specifically, the second rolling assembly RA2 includes at least three second rolling elements RE2, which are respectively disposed in the at least three receiving grooves 104G and the at least three receiving grooves 209G. Therefore, the second movable element 209 can move along the first axis AX1 with respect to the second frame 104 of the second movable assembly MA2 by the second rolling elements RE2.

As shown in FIG. 10, when viewed along the main axis MX (the second axis AX2), the second rolling elements RE2 may form a triangle, and the triangle is an isosceles triangle, but it is not limited thereto. Furthermore, the receiving grooves 104G are concaved from a receiving surface 104S1 in the receiving trench 104R, and the receiving grooves 104G are communicated with the receiving trench 104R.

Figure 11:
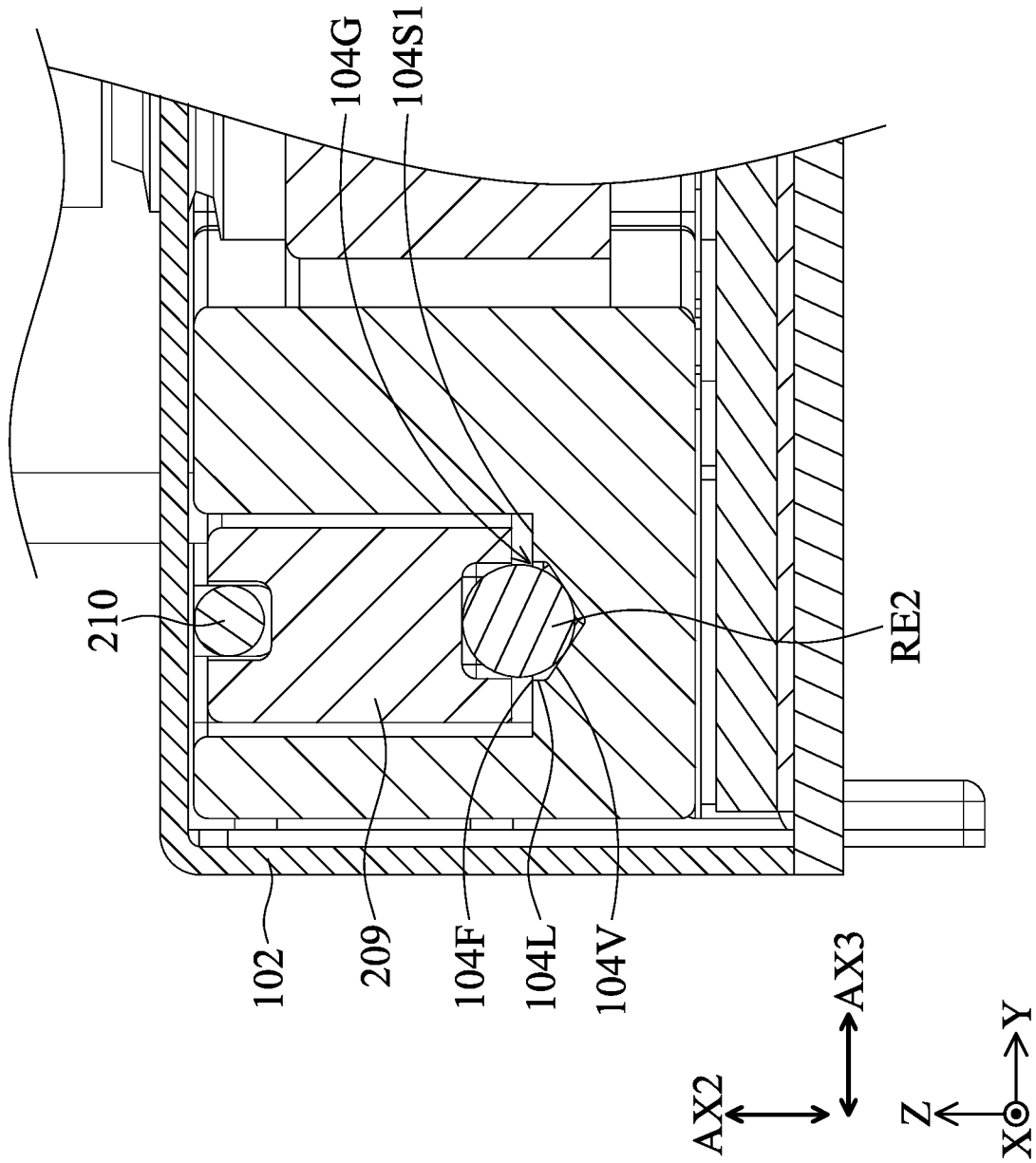
FIG. 11 is a cross-sectional view of the optical system 10 along the line A-A in FIG. 1 according to an embodiment of the present disclosure.

Next, please refer to FIG. 11. FIG. 11 is a cross-sectional view of the optical system 10 along the line A-A in FIG. 1 according to an embodiment of the present disclosure. As shown in FIG. 11, when viewed along the first axis AX1 (the X-axis), at least one of the receiving grooves 104G includes a V-shaped structure 104V and two straight line structures 104L.

The V-shaped structure 104V is connected to the receiving surface 104S1 via the two straight line structures 104L. In this embodiment, the two straight line structures 104L can be connected to the receiving surface 104S1 via two fillets 104F, respectively. In this embodiment, the radius of curvature of the fillet 104F is less than 0.04 mm, but it is not limited thereto. Furthermore, as shown in FIG. 11, the second rolling element RE2 is in contact with the V-shaped structure 104V.

Please return to FIG. 5. As shown in FIG. 5, the first optical element driving mechanism 200 further includes a first position sensing element SE1 and an electronic element RT, which are disposed on the first circuit assembly 214. One of the two first coils CL1 surrounds the first position sensing element SE1, and the other of the two first coils CL1 surrounds the electronic element RT. The first position sensing element SE1 can be, for example, a Hall sensor, and the electronic element RT can be, for example, a capacitor, but they are not limited thereto.

The first position sensing element SE1 is configured to sense the change of the magnetic field of the first magnetic element MG1 to obtain the position of the second movable element 209. It is worth noting that the first position sensing element SE1 only corresponds to one of the two first magnetic elements MG1. For example, when the second movable element 209 moves and when viewed along the third axis AX3, the first position sensing element SE1 only overlaps one of the two first magnetic elements MG1 and does not overlap the other one of the two first magnetic elements MG1.

As shown in FIG. 1 and FIG. 5, the first circuit assembly 214 has a first electrical connection portion 2141, and the second circuit assembly 114 has a second electrical connection portion 1141. The first electrical connection portion 2141 and the second electrical connection portion 1141 are configured to be electrically connected to the external control circuit. The first electrical connection portion 2141 and the second electrical connection portion 1141 are located on the same side of the optical system 10.

As shown in FIG. 5, the second base 112 has a first supporting portion ST1 configured to support the first electrical connection portion 2141, and the second base 112 further has a second supporting portion ST2 configured to support the second electrical connection portion 1141. Furthermore, the second base 112 further has a middle dividing portion SPC connected between the first supporting portion ST1 and the second supporting portion ST2. The middle dividing portion SPC is configured to separate the first electrical connection portion 2141 and the second electrical connection portion 1141.

When viewed along the first axis AX1, the middle dividing portion SPC completely overlaps the first electrical connection portion 2141 or the second electrical connection portion 1141. Furthermore, the first electrical connection portion 2141 has a first outer surface 2143, the second electrical connection portion 1141 has a second outer surface 1143, and the first outer surface 2143 and the second outer surface 1143 are located on the same plane.

The second base 112 further includes a bottom plate 1120, and the first supporting portion ST1 and the second supporting portion ST2 extend from the bottom plate 1120 along the second axis AX2. The distance DS1 between the first electrical connection portion 2141 and the bottom plate 1120 in the second axis AX2 is equal to the distance DS2 between the second electrical connection portion 1141 and the bottom plate 1120 in the second axis AX2.

Furthermore, in this embodiment, the optical system 10 may include a first adhesive element AD1, a second adhesive element AD2, and a third adhesive element AD3. As shown in FIG. 5, the first adhesive element AD1 is configured to affix the first electrical connection portion 2141 to the first supporting portion ST1, and the second adhesive element AD2 is configured to affix the second electrical connection portion 1141 to the second supporting portion ST2.

It should be noted that the first adhesive element AD1 is not in contact with the second electrical connection portion 1141, and the second adhesive element AD2 is not in contact with the first electrical connection portion 2141. Furthermore, as shown in FIG. 1, after the casing 102 covers the second base 112, the third adhesive element AD3 is configured to adhere to the first electrical connection portion 2141, the second electrical connection portion 1141 and the casing 102. When viewed along the third axis AX3, the third adhesive element AD3 overlaps the first electrical connection portion 2141 and the second electrical connection portion 1141.

In this embodiment, the first adhesive element AD1, the second adhesive element AD2, and the third adhesive element AD3 may be, for example, thermal curing glue, but it is not limited thereto. For example, in some embodiments, the first adhesive element AD1 and the second adhesive element AD2 are thermal curing glue, and the third adhesive element AD3 is UV-curable adhesive.

Figure 12:
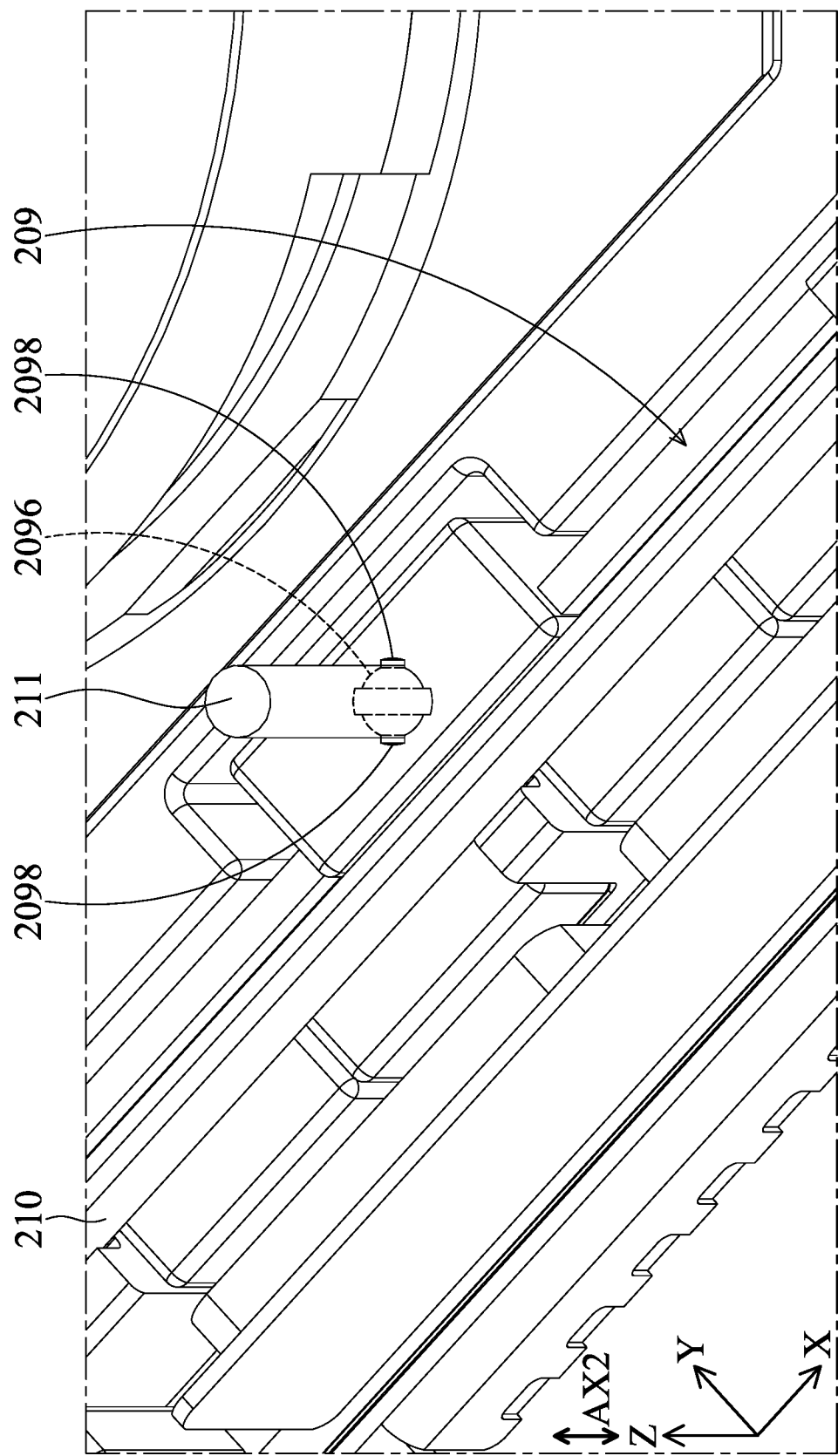
FIG. 12 is an enlarged view of a partial structure of the optical system 10 according to an embodiment of the present disclosure.

Please refer to FIG. 12, which is an enlarged view of a partial structure of the optical system 10 according to an embodiment of the present disclosure. In this embodiment, a circular slot 2096 can be formed on the second movable element 209, and the driving member 211 is inserted in the circular slot 2096. The circular slot 2096 extends along the second axis AX2.

Furthermore, a plurality of glue grooves 2098 is formed on the second movable element 209 and is communicated with the circular slot 2096. Each glue groove 2098 is radially protruded from the circular slot 2096, and each glue groove 2098 also extends along the second axis AX2. These glue grooves 2098 are configured to accommodate glue (not shown) so that the driving member 211 may be affixed in the circular slot 2096.

Figure 13:
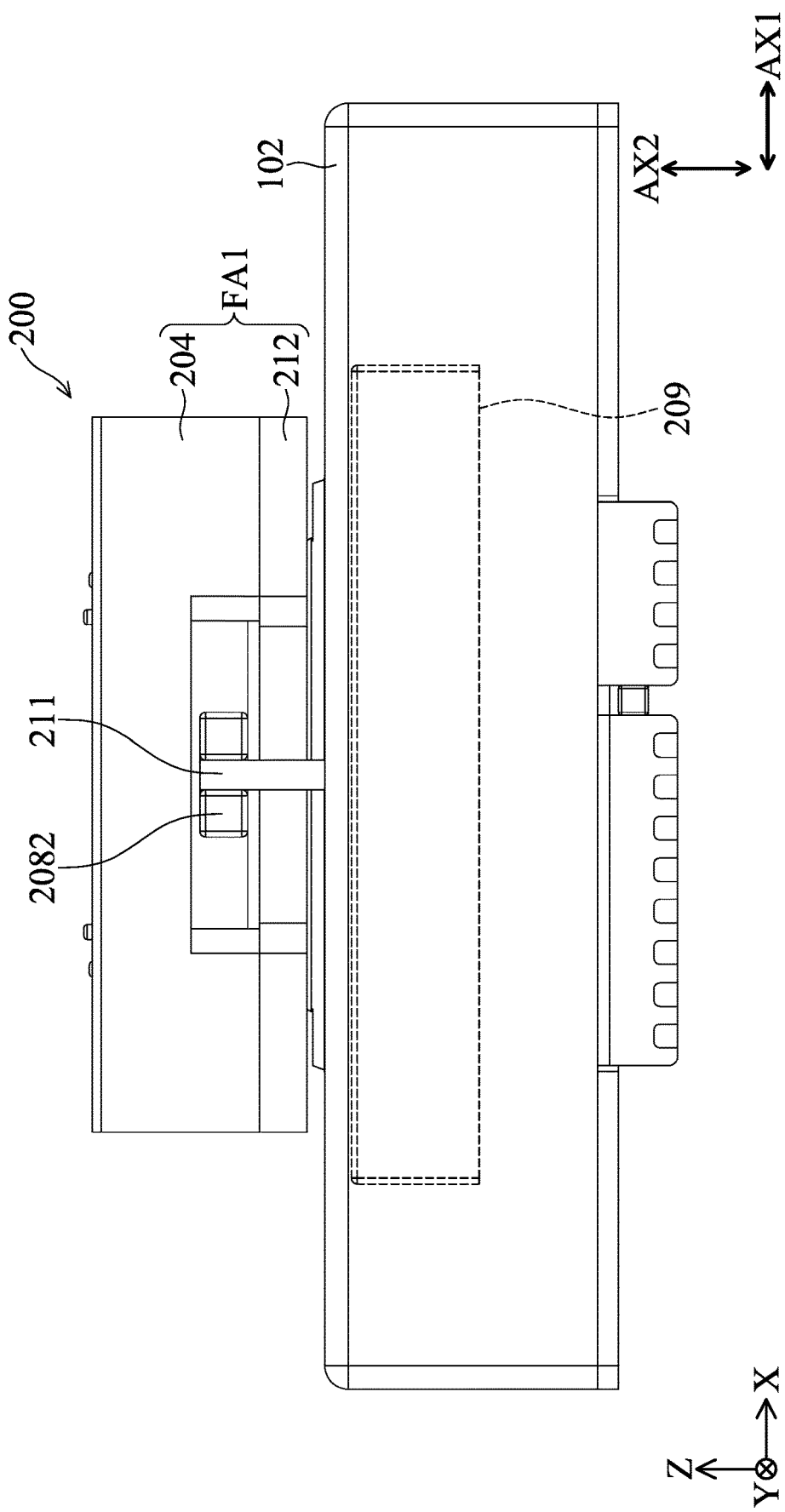
FIG. 13 is a front view of the optical system 10 according to an embodiment of the present disclosure.
Figure 14:
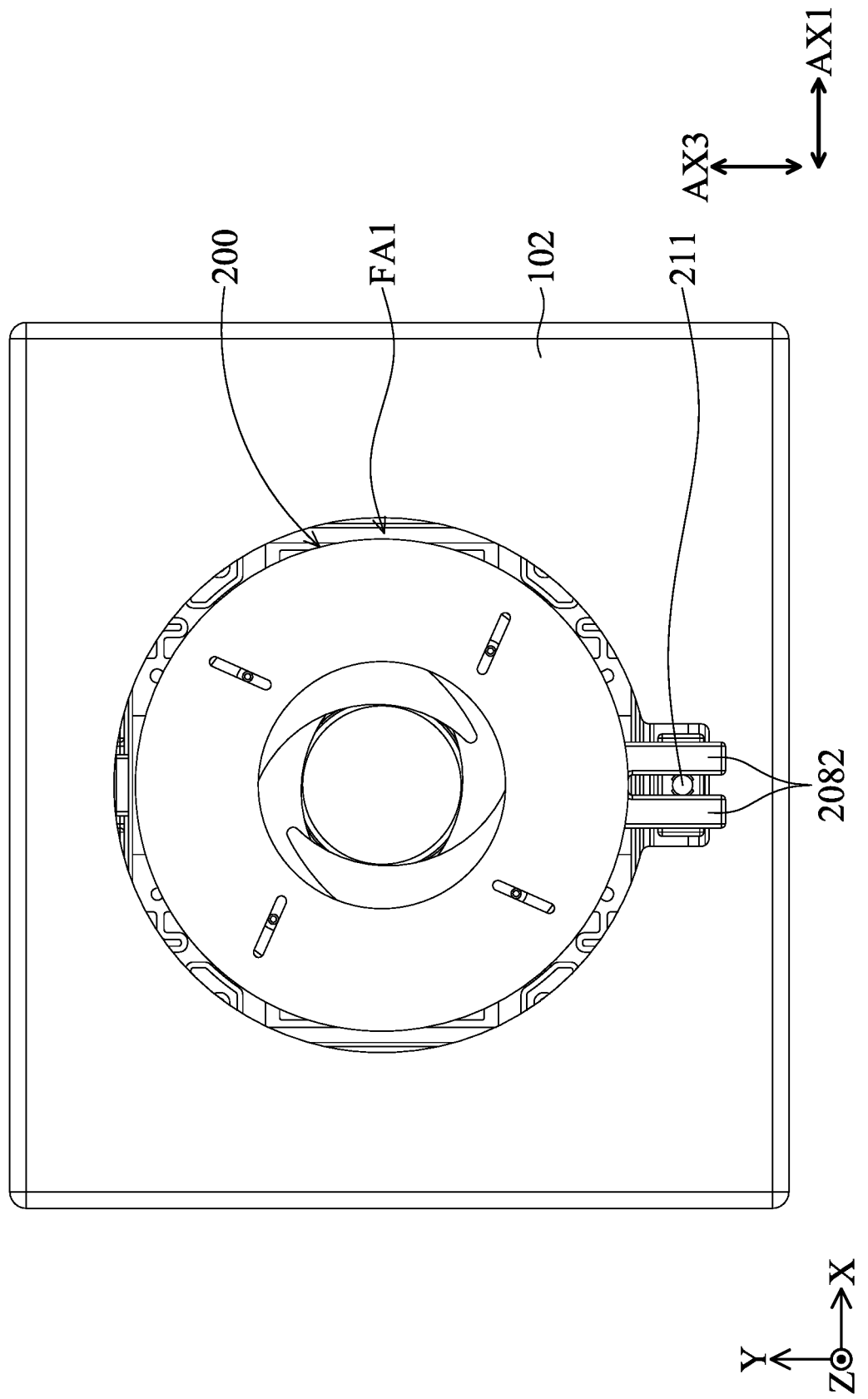
FIG. 14 is a top view of the optical system 10 according to an embodiment of the present disclosure.

Please refer to FIG. 13 and FIG. 14. FIG. 13 is a front view of the optical system 10 according to an embodiment of the present disclosure, and FIG. 14 is a top view of the optical system 10 according to an embodiment of the present disclosure. As shown in FIG. 13, a portion of the first optical element driving mechanism 200 is located outside the casing 102. For example, the first fixed assembly FA1 is located outside the casing 102. When viewed along the third axis AX3, the first fixed assembly FA1 does not overlap the casing 102.

Furthermore, the second movable element 209 is located inside the casing 102, and the driving member 211 extends from the inside of the casing 102 to the outside of the casing 102. As shown in FIG. 14, when viewed along the second axis AX2, the clamping portion 2082 overlaps at least a portion of the casing 102. When viewed along the second axis AX2, the first fixed assembly FA1 does not overlap the casing 102.

In conclusion, the present disclosure provides an optical system 10 including a first optical element driving mechanism 200 and a second optical element driving mechanism 100. The first optical element driving mechanism 200 may serve as an aperture mechanism, configured to adjust the amount of light entering the optical system 10. The second optical element driving mechanism 100 can achieve the functions of auto-focusing (AF) and optical image stabilization (OIS).

In some embodiments, when the second movable element 209 is driven to move along the first axis AX1, the driving member 211 is configured to be in contact with the clamping portion 2082 to drive the first movable element 208 to rotate around the main axis MX, thereby drive the first optical elements OE1 to adjust the size of the aperture. It is worth noting that, the second movable element 209 is disposed in the second frame 104 of the second optical element driving mechanism 100, so the purpose of miniaturization can be achieved. Furthermore, based on the configurations of the second movable element 209, the driving member 211 and the first movable element 208, the size of the aperture of the first optical element driving mechanism 200 can be continuously changed.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical system, comprising:
   a first optical element driving mechanism, comprising:
   a first fixed assembly;
   a first movable assembly, configured to be connected to a first optical element, wherein the first movable assembly is movable relative to the first fixed assembly, and the first movable assembly comprises a first movable element; and
   a first driving assembly, configured to drive the first movable assembly to move relative to the first fixed assembly,
   wherein the first fixed assembly and the first movable assembly are arranged along a main axis, and the first driving assembly is configured to drive the first movable element to move around the main axis,
   wherein the optical system further comprises a second optical element driving mechanism,
   wherein the first optical element driving mechanism is disposed on the second optical element driving mechanism,
   wherein the first fixed assembly comprises:
   an outer shielding member;
   a first frame; and
   a first base,
   wherein the first frame is affixed to the first base,
   wherein the first movable element is rotatable around the main axis relative to the first frame,
   wherein the second optical element driving mechanism comprises a second fixed assembly,
   wherein the second fixed assembly comprises a casing and a second base,
   wherein the casing is affixed to the second base,
   wherein the first fixed assembly is disposed on the casing, and
   wherein the casing surrounds a portion of the first optical element driving mechanism.

2. The optical system as claimed in claim 1, wherein
   the outer shielding member is affixed to the first frame;
   the first frame is located between the outer shielding member and the first base;
   the first movable element is disposed in the first frame.

3. The optical system as claimed in claim 2, wherein
   the first optical element driving mechanism further comprises a first rolling assembly disposed between the first movable element and the first base;
   the first rolling assembly comprises at least three first rolling elements;
   the first movable element rotates around the main axis relative to the first base and the first frame by the first rolling elements;
   the first optical element is movably connected to the first movable element;
   when the first movable element rotates around the main axis, the first optical element moves relative to the first fixed assembly and the first movable assembly, so as to adjust an amount of external light entering the first optical element driving mechanism.

4. The optical system as claimed in claim 3, wherein
   the first optical element driving mechanism further comprises an inner shielding member;
   the inner shielding member is disposed between the outer shielding member and the first movable element;
   when viewed along the main axis, the outer shielding member has a ring structure and a first outer opening;
   when viewed along the main axis, the inner shielding member has a ring structure and a first inner opening;
   a maximum size of the first outer opening is different from a maximum size of the first inner opening;
   the maximum size of the first outer opening is greater than the maximum size of the first inner opening.

5. The optical system as claimed in claim 4, wherein
   a first guiding groove is formed on the outer shielding member;
   the first optical element has a first upper protruding pillar and a first lower protruding pillar;
   when viewed along the main axis, the first upper protruding pillar does not overlap the first lower protruding pillar;
   the first lower protruding pillar is configured to insert the first movable element;
   the first guiding groove is configured to accommodate the first upper protruding pillar.

6. The optical system as claimed in claim 5, wherein
   when the first movable element rotates around the main axis, the first optical element rotates around the first lower protruding pillar, and the first upper protruding pillar is configured to move along the first guiding groove, so that the first optical element selectively blocks the first inner opening;

when viewed along the main axis, the extending direction of the first guiding groove is deviated from a center of the outer shielding member.

7. The optical system as claimed in claim 6, wherein
the second optical element driving mechanism further comprises:
a second movable assembly, configured to be connected to a second optical element; and
a second driving assembly, configured to drive the second movable assembly and the second optical element to move relative to the second fixed assembly;
the casing is affixed to the second base to form an accommodation space;
the accommodation space is configured to accommodate the second movable assembly and the second driving assembly;
the second movable assembly has a receiving trench extending along a first axis;
the first movable assembly comprises a second movable element disposed in the receiving trench;
the second movable element is configured to move along the first axis in the receiving trench.

8. The optical system as claimed in claim 7, wherein
the first optical element driving mechanism further comprises a driving member affixed to the second movable element;
the driving member has a cylindrical structure and extends along a second axis;
the second axis is perpendicular to the first axis;
the second axis is parallel to the main axis;
a circular slot is formed on the second movable element, and the driving member is inserted into the circular slot;
a plurality of glue grooves is formed on the second movable element and is communicated with the circular slot;
the glue grooves are configured to accommodate glue so that the driving member is affixed in the circular slot.

9. The optical system as claimed in claim 8, wherein
the first movable element has a first body and a clamping portion;
when viewed along the main axis, the clamping portion has a U-shaped structure;
the clamping portion radially extends from the first body;
the clamping portion is configured to clamp the driving member;
when the second movable element moves along the first axis, the driving member is configured to be in contact with the clamping portion to drive the first movable element to rotate around the main axis, thereby driving the first optical element to selectively block the first inner opening.

10. The optical system as claimed in claim 9, wherein
the first body has plastic material;
the clamping portion has a plastic material and a metal material, and the plastic material covers the metal material;
the first frame has an arc opening;
the clamping portion is exposed from the arc opening;
an angle of the arc opening is greater than a limit movement angle of the first movable element.

11. The optical system as claimed in claim 10, wherein
the second movable element has a second body;
the second body has a long strip-shaped structure extending along the first axis;
when viewed along the main axis, a length of the receiving trench in the first axis is greater than a length of the second body in the first axis;
the receiving trench has a middle receiving portion and two side receiving portions;
the two side receiving portions extend from the middle receiving portion along the first axis;
the middle receiving portion is configured to accommodate the second body.

12. The optical system as claimed in claim 11, wherein
the first optical element driving mechanism further comprises a blocking member having a long strip-shaped structure extending along the first axis;
the blocking member is fixedly disposed in the two side receiving portions;
the second movable element further comprises two receiving structures disposed on opposite sides of the second body;
the blocking member is suspended in the two receiving structures;
the blocking member is not in contact with the receiving structures;
the blocking member is not in contact with the second body.

13. The optical system as claimed in claim 12, wherein
the second movable assembly further comprises at least three receiving grooves, extending along the first axis;
the first optical element driving mechanism further comprises a second rolling assembly disposed between the second movable element and the second movable assembly;
the second rolling assembly comprises at least three second rolling elements, which are respectively disposed in the at least three receiving grooves;
the second movable element moves along the first axis relative to the second movable assembly by the second rolling elements;
when viewed along the main axis, the second rolling elements form a triangle;
the triangle is an isosceles triangle.

14. The optical system as claimed in claim 13, wherein
the receiving grooves are concaved from a receiving surface in the receiving trench;
the receiving grooves are communicated with the receiving trench;
when viewed along the first axis, at least one of the receiving grooves comprises a V-shaped structure and two straight line structures;
the V-shaped structure is connected to the receiving surface via the two straight line structures;
the two straight line structures are respectively connected to the receiving surface via two fillets;
a radius of curvature of each fillet is less than 0.04 mm;
the second rolling element is in contact with the V-shaped structure.

15. The optical system as claimed in claim 14, wherein
the first optical element driving mechanism further comprises a first circuit assembly fixedly disposed on the casing;
when viewed along a third axis, the first circuit assembly has an L-shaped structure;
the third axis is perpendicular to the first axis and the second axis;
the first driving assembly comprises a first magnetic element fixedly disposed on the second movable element;

the first driving assembly further comprises a first coil, corresponding to the first magnetic element;

the first coil is fixedly disposed on the first circuit assembly;

the first optical element driving mechanism further comprises a first position sensing element disposed on the first circuit assembly;

the first coil surrounds the first position sensing element;

the first position sensing element corresponds to the first magnetic element.

16. The optical system as claimed in claim 15, wherein the second optical element driving mechanism further comprises a second circuit assembly electrically connected to the second driving assembly;

the first circuit assembly has a first electrical connection portion;

the second circuit assembly has a second electrical connection portion;

the first electrical connection portion and the second electrical connection portion are located on a same side of the optical system.

17. The optical system as claimed in claim 16, wherein the second base has a first supporting portion configured to support the first electrical connection portion;

the second base further has a second supporting portion configured to support the second electrical connection portion;

the second base further has a middle dividing portion connected between the first supporting portion and the second supporting portion;

the middle dividing portion is configured to separate the first electrical connection portion and the second electrical connection portion;

when viewed along the first axis, the middle dividing portion completely overlaps the first electrical connection portion or the second electrical connection portion.

18. The optical system as claimed in claim 17, wherein the first electrical connection portion has a first outer surface;

the second electrical connection portion has a second outer surface;

the first outer surface and the second outer surface are located on a same plane;

the second base further comprises a bottom plate, and the first supporting portion and the second supporting portion extend from the bottom plate along the second axis;

a distance between the first electrical connection portion and the bottom plate in the second axis is equal to a distance between the second electrical connection portion and the bottom plate in the second axis.

19. The optical system as claimed in claim 18, wherein the optical system comprises a first adhesive element, a second adhesive element and a third adhesive element;

the first adhesive element is configured to affix the first electrical connection portion to the first supporting portion;

the second adhesive element is configured to affix the second electrical connection portion to the second supporting portion;

the first adhesive element is not in contact with the second electrical connection portion;

the second adhesive element is not in contact with the first electrical connection portion;

the third adhesive element is configured to adhere to the first electrical connection portion, the second electrical connection portion and the casing;

when viewed along the third axis, the third adhesive element overlaps the first electrical connection portion and the second electrical connection portion.

20. The optical system as claimed in claim 19, wherein a portion of the first optical element driving mechanism is located outside the casing;

the first fixed assembly is located outside the casing;

when viewed along the third axis, the first fixed assembly does not overlap the casing;

the second movable element is located within the casing;

the driving member extends from the inside of the casing to the outside of the casing;

when viewed along the second axis, the clamping portion overlaps at least a portion of the casing;

when viewed along the second axis, the first fixed assembly does not overlap the casing.

* * * * *